(12) United States Patent
Latin-Stoermer et al.

(10) Patent No.: US 10,719,838 B2
(45) Date of Patent: Jul. 21, 2020

(54) GENERATING EVENT RECOMMENDATIONS BASED UPON MEDIA CONSUMPTION

(71) Applicant: Amazon Technologies, Inc., Seattle, WA (US)

(72) Inventors: Toby Ray Latin-Stoermer, Seattle, WA (US); Scott K. Meaker, Seattle, WA (US); Scott Durham, Seattle, WA (US); Stephen C. Mack, Seattle, WA (US); Ralph Cameron Harvey, Federal Way, WA (US); Erin O. Anderson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 498 days.

(21) Appl. No.: 15/482,241

(22) Filed: Apr. 7, 2017

(65) Prior Publication Data

US 2017/0213229 A1 Jul. 27, 2017

Related U.S. Application Data

(62) Division of application No. 13/414,779, filed on Mar. 8, 2012, now Pat. No. 9,660,971.

(51) Int. Cl.
| | |
|---|---|
| *G06Q 30/00* | (2012.01) |
| *G06Q 30/02* | (2012.01) |
| *H04L 29/06* | (2006.01) |
| *H04W 4/029* | (2018.01) |
| *H04W 4/02* | (2018.01) |
| *G06F 16/9537* | (2019.01) |

(Continued)

(52) U.S. Cl.
CPC ....... *G06Q 30/0206* (2013.01); *G06F 16/435* (2019.01); *G06F 16/9537* (2019.01); *G06Q 50/01* (2013.01); *H04L 63/08* (2013.01); *H04W 4/02* (2013.01); *H04W 4/029* (2018.02)

(58) Field of Classification Search
CPC .... H04L 63/08; G06Q 30/0206; G06Q 50/01; H04W 4/029; H04W 4/02; G06F 16/435; G06F 16/9537
USPC ..................................... 705/26, 27
See application file for complete search history.

(56) References Cited

U.S. PATENT DOCUMENTS

| | | |
|---|---|---|
| 8,635,120 B1 | 1/2014 | Velummylum et al. |
| 8,892,648 B1 | 11/2014 | Durham et al. |
| 9,141,960 B2 * | 9/2015 | Feldman ................ G06Q 30/02 |

(Continued)

OTHER PUBLICATIONS

Site of the Week: Last.fm; Heater, Brian. PC Magazine Online: NA. Ziff Davis, Inc. (May 4, 2007); Dialog #163014550' 4pgs. (Year: 2007).*

(Continued)

*Primary Examiner* — Robert M Pond
(74) *Attorney, Agent, or Firm* — Thomas Horstemeyer, LLP

(57) ABSTRACT

Disclosed are various embodiments for generating event recommendations. Embodiments of the disclosure identify an event associated with a location and an artist. An artist recommendation corresponding to the artist is generated for users based upon the media consumption of the users. An event recommendation corresponding to the event is generated for users near the location. A level of demand for the event is determined based upon a conversion rate.

20 Claims, 7 Drawing Sheets

(51) Int. Cl.
*G06F 16/435* (2019.01)
*G06Q 50/00* (2012.01)

(56) References Cited

U.S. PATENT DOCUMENTS

| | | | |
|---|---|---|---|
| 2006/0277130 A1* | 12/2006 | Harmon | G06Q 30/06 705/35 |
| 2008/0320078 A1* | 12/2008 | Feldman | G06Q 30/02 709/203 |
| 2009/0197681 A1 | 8/2009 | Krishnamoorthy et al. | |
| 2009/0287687 A1 | 11/2009 | Martire et al. | |
| 2010/0121857 A1 | 5/2010 | Elmore et al. | |
| 2011/0131098 A1* | 6/2011 | Bafia | G06Q 30/02 705/14.69 |
| 2011/0225039 A1 | 9/2011 | Goldman et al. | |
| 2011/0295661 A1* | 12/2011 | Dodge | G06Q 30/0241 705/14.4 |
| 2012/0078667 A1 | 3/2012 | Denker et al. | |
| 2012/0215684 A1 | 8/2012 | Kidron | |
| 2013/0073473 A1 | 3/2013 | Heath | |

OTHER PUBLICATIONS

Last.fm; Last.fm Launches Personalized Visual Music Player Delivering Unparalleled, Multisensory Listening Experience Anonymous. Marketing Weekly News [Atlanta] May 23, 2009: 91; Dialog #202981216 . (Year: 2009).*

Last.fm Home Page; Internet Archive Wayback Machine www.last.fm; Jan.-Feb. 2012, 7pgs. (Year: 2012).*

U.S. Appl. No. 13/049,251, entitled "File System Merchandising," filed Mar. 16, 2011, and issued to U.S. Pat. No. 8,635,120 on Jan. 21, 2014.

U.S. Appl. No. 13/161,176, entitled "Recommendations Based on File Activity in a Networked Storage System," filed Jun. 15, 2011.

U.S. Appl. No. 13/173,494, entitled "Media Player Social Network Integration," filed Jun. 30, 2011, and issued to U.S. Pat. No. 8,892,648 on Nov. 18, 2014.

U.S. Appl. No. 14/537,808, entitled "Media Player Social Network Integration," filed Nov. 10, 2014.

* cited by examiner

FIG. 4

Your Music Player

Hello, Joe   Settings   Sign Out   Help

Upload Files

All Files
Your MP3 Purchases

☐ Joe's Music
  ⊞ Albums
  ⊞ Genres
  ⊞ Artists
  ⊞ Playlists

Your friends are attending these events that might interest you:

Michael Doe
Mega-theater West
1/21/2011

Birthday Band — 201
Pico-theater North
2/21/2011

[Play all]   [Add to playlist]
[Download]  [🗑 Delete]

- 07 – Birthday Song
- Michael Doe Anthem 1.0.mp3
- Michael Doe Anthem 1.1.mp3
- 04 – Thriller.mp3
- Blah blah.mp3
- 12 – Come Around.mp3
- 01 – Bamboo Banga.mp3
- 02 – Bird Flu.mp3
- 07 – 20 Dollar.mp3
- 06 – Mango Pickle Down River.mp3
- 05 – Hussel.mp3

◨ Feed  ▦ Friends  ▦ Artists — 209

Jane Smith
is listening to The Birthday Song by the Birthday Band                Like  Comment
Listening now                                              Listen with Jane AJ Foe
listened to Cheese Puffs Song by
the Cheese Quartet                                       Like  Comment
12 minutes ago AJ Foe
likes the Cheese Quartet                                 Like  Comment
45 minutes ago Currently Playing         Album:            Genre:
Human Nature - Michael Doe   Mega-album    Mega-album

[Like] [Comment]
[Share] [Rate]     — 139

FIG. 5

GENERATING EVENT RECOMMENDATIONS BASED UPON MEDIA CONSUMPTION

CROSS-REFERENCE TO RELATED APPLICATIONS

This application is a divisional of, and claims priority to, co-pending U.S. Patent Applications entitled "GENERATING EVENT RECOMMENDATIONS BASED UPON MEDIA CONSUMPTION," filed on Mar. 8, 2012, and assigned application Ser. No. 13/414,779, which is incorporated herein by reference in its entirety.

BACKGROUND

Users may play, browse or consume media in a media player and/or a media player user interface. Users may also be linked with other users in various social networking systems who may also play or browse media in a media player. Users may have an interest in learning about events in a particular location that are related to artists, authors, performers, composers, etc., which are related to media they consume. These users may often fail to obtain information about events within a particular location that are tailored to their interests and preferences.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2-5 are drawings of an example of user interfaces rendered by a client in the networked environment of FIG. 1 according to various embodiments of the present disclosure.

DETAILED DESCRIPTION

Embodiments of the disclosure are directed to generating event recommendations to users consuming media in media players and/or media player user interfaces generated by media hosting and/or storage systems. Media consumption and/or preferences of a user can be observed as well as a location associated with the user, whether the location is a real-time location and/or a location that is specified by the user or from other data sources. Events that may be of interest to the user based upon the observed media consumption are generated and provided to the user. Additionally, other information associated with the user can also be utilized to refine and/or improve the recommendations. Some examples of additional information that can be employed includes, but is not limited to, media consumption activity of other users linked to the user in a social network, other types of content in which the user expresses an interest, artists or performers to which the user expresses an interest in a social networking or micro-blogging system, and other information as are discussed herein.

Information about the media consumption of a user may be obtained by way of a networked storage system that is employed by the user. Such a networked storage system may allow users to access their media items from a variety of locations through a variety of client computing devices. As a non-limiting example, a user may watch a movie file stored in the networked storage system at home using a networked television. As another non-limiting example, the user may continue watching the same movie file while on the go using a mobile device with network connectivity, e.g., a smartphone, tablet computer, etc. Because the accesses are through the networked storage system, media consumption patterns during a variety of times and at a variety of locations may be determined. Various techniques relating to recommending files based on file system content or activity are described in U.S. patent application Ser. No. 13/049,251, entitled "FILE SYSTEM MERCHANDISING," which was filed on Mar. 16, 2011, and in U.S. patent application Ser. No. 13/161,176, entitled "RECOMMENDATIONS BASED ON FILE ACTIVITY IN A NETWORKED STORAGE SYSTEM," which was filed on Jun. 15, 2011, both of which are incorporated herein by reference in their entirety. Additionally, various techniques for generating artist recommendations to a user based upon the activity of other users to which the user is linked in social networking systems are described in U.S. patent application Ser. No. 13/173,494, entitled "MEDIA PLAYER SOCIAL NETWORK INTEGRATION," which was filed on Jun. 30, 2011, which is also incorporated herein by reference in its entirety. In the following discussion, a general description of the system and its components is provided, followed by a discussion of the operation of the same.

Figure 1:
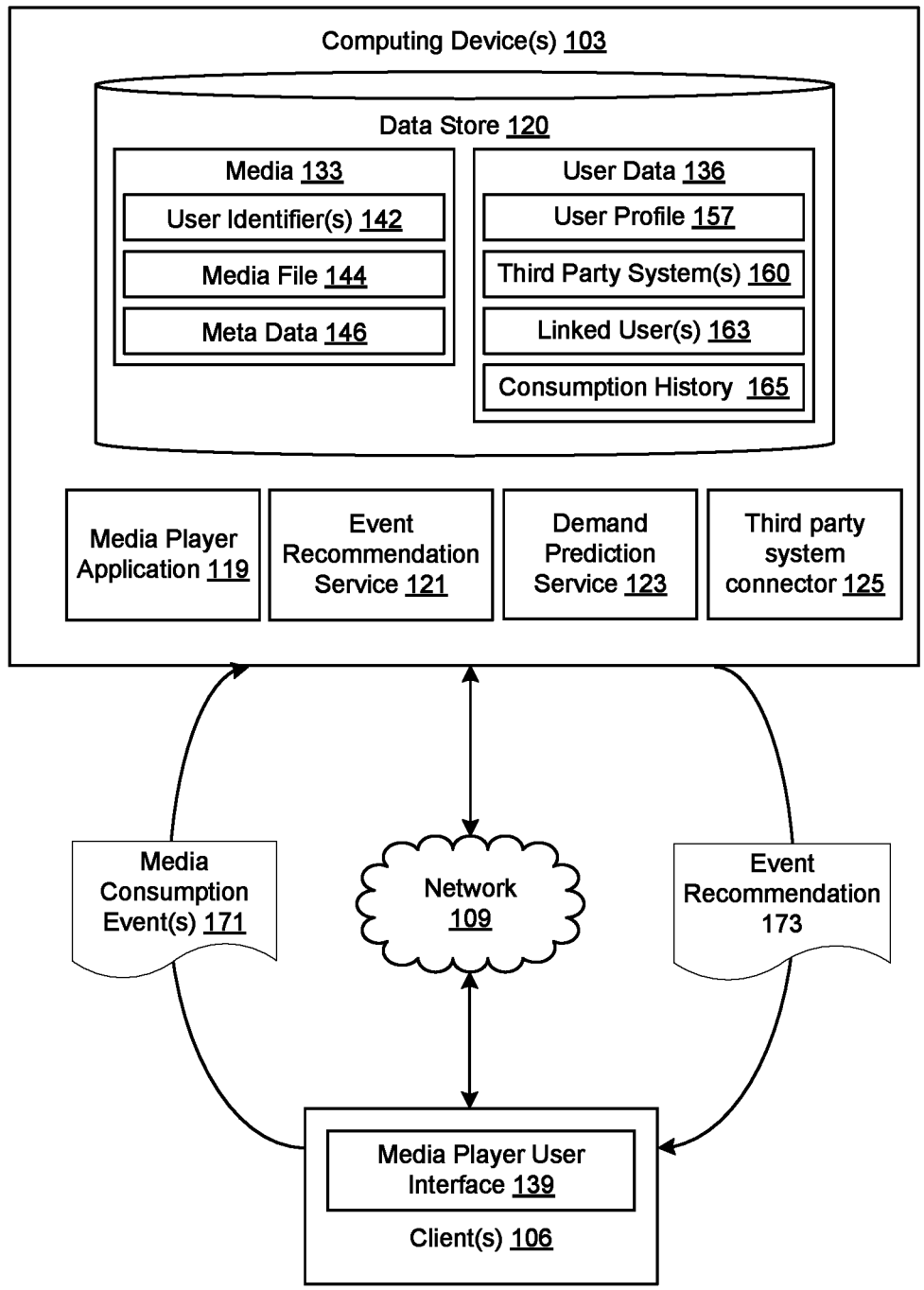
FIG. 1 is a drawing of a networked environment according to various embodiments of the present disclosure.

With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103 and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include a media player application 119, an event recommendation service 121, a demand prediction service 123 and other applications, services, processes, systems, engines, or functionality not discussed in detail herein. In one embodiment, the media player application 119 is executed to generate a media player user interface 139 rendered in a browser or other application on a client 106. In some embodiments, the media player application 119 can be executed to provide data (e.g., streaming media) to a special purpose application executed on a client 106 as well as allow the user on a client 106 to submit data via such an application to the media player application 119 and/or other services executed by the computing device 103 as will be described herein. The media player application 119 can allow users to access media stored in the data store 120 and/or any other system, such as a cloud storage system. In some embodiments, the media player application 119 can provide information about media, other users, and other data to an application executed on a client that accesses media stored locally on a client and/or a storage device accessible to the client. In some embodiments, the media player application 119 can allow the user to purchase and/or rent media that is downloaded and/or streamed to a client associated with the user.

The event recommendation service 121 can generate event recommendations that are associated with artists that are in or related to a media collection associated with a user. An event recommendation can comprise information about an event that is associated with an artist that is within or near a location associated with a user. The location can comprise a real-time location of the user captured by a location finding capability of a mobile device or other computing system in which the media player user interface 139 is rendered. The location can also comprise an address associated with a user profile of the user. An event can include a concert, performance, or other event that is in some way associated with an artist that is in or related to the user's media collection.

The demand prediction service 123 can determine a predicted level of demand for tickets to a particular event in or near a particular location. The demand prediction service 123 can determine a predicted level of demand based at least upon an aggregate number of users associated with a particular location to whom an event recommendation is provided as well as a conversion rate that expresses an aggregate percentage of users who are likely to act on such a recommendation and purchase tickets to the event.

The third party system connector 125 can facilitate communication with an application programming interface provided by a third party system, such as a social networking system, microblogging system, ticketing system, or any other system or site in which content can be published and made available to the computing device 103. The third party system connector 125 can facilitate publishing data within a third party system and/or retrieving data regarding users from the third party system provided appropriate authentication credentials such as a username/password pair, an authentication token, etc., are available. For example, a third party system can provide an application programming interface (API) with which users or other entities can develop applications. The API can, subject to authorization of a user, expose various functionality of a social networking system to applications using the API, such as access to information about users, their friends, interests, images, videos, etc. In this way, the media player application 119 and/or event recommendation service 121 can, via the third party system connector 125 and the API, publish content and/or retrieve content from the third party system and subsequently display the content in a media player user interface and generate event recommendations based on the activity of other users to whom a user is linked as well as content the user interacts with in various third party systems as will be described herein.

Also, the computing device 103 can include at least one data store 120, which may comprise data and applications operable to provide access to the data stored therein. It should be appreciated that the data store 120 may or may not reside within a computing device 103, but may be accessible via a network to the computing device 103. The data store 120 can include media 133, which can include various information about media associated with a user that can be consumed in a media player user interface. In the context of the present disclosure, media can include audio, video, images, or any other type of media that can be viewed and/or streamed to a client 106. Various media 133 stored in the data store 120 can be associated with one or more users. Accordingly, each media 133 entry can be associated with one or more user identifiers 142. In one embodiment, users can purchase and/or upload media 133 to be stored in the data store 120. Therefore, the user identifiers 142 associated with media 133 entries can be employed to manage access restrictions and/or digital rights management issues as should be appreciated. In one example, the user identifiers 142 associated with a media 133 entry can identify users of the system that own or have the authority to download, play and/or stream the media 133. In another example, a user may store a media file on a local file system in a client 106. Accordingly, the user can be associated with a corresponding media 133 entry so that the artist and/or event recommendations can be generated for the user based upon the user's consumption associated with such a media file.

Each media 133 entry can also include a media file 144. A media file 144 can include a digital media file representing the media entry in one or more of various media formats. For example, the media file 144 associated with a media 133 entry can include, but is not limited to, an MPEG-1 Audio Layer III (MP3 file) representing an audio track, an MPEG 4 audio file, flash video (flv file), or any audio, video, or image format in which media can be stored and/or streamed to a client 106. Each media 133 entry can also be associated with various meta data 146, which can include artist information, a title, author, album association, genre, or any other data by which a media 133 entry can be categorized.

The data store 120 can also include user data 136, which can store information about users of a media player application 119 as described herein. User data 136 can include, for example, a user profile 157, which can include demographic information about a user, shipping addresses, telephone numbers, payment information, e-mail addresses, purchasing history, product browsing history, affinity groups with which the user is affiliated, and other data related to users. User data 136 can also include one or more third party systems 160 with which the user is associated. In one embodiment, a user of the media player application 119 can link one or more third party sites with an account of the user, which can allow the media player application 119 to access content associated with the user from the third party site as well as potentially publish information about the user's media consumption and/or interests in the third party site.

User data 136 can also include identifiers associated with one or more linked users 163 with which the user is linked in a site facilitated by the media player application 119. Linked users 163 can include friends or other acquaintances of the user that the user has authorized to receive information about the user's media consumption and/or interests. Additionally, the linked users 163 represent other users for which a user desires to receive information about media consumption and/or interests, such as friends as well as artists in which a user expresses an interest. User data 136 can also include a consumption history 165 associated with a user account. In one embodiment, a consumption history 165 can include a browse history of various media available via the media player application 119, media that the user has consumed ("played") and/or indicated an interest, user interactions with content that can associated with a media entry, an artist and/or any other meta data 146 associated with a media 133 entry. The consumption history 165 can be received from a client device 106 in the form of media consumption events 171 as will be described herein.

The third party system 160 can include any type of user community, microblogging service, etc. A user of a social networking system can have an identity and interact with other users of the social networking system, publish content, and take advantage of other functionality generally found within a social networking system. Users can have a direct connection to other users. In one embodiment, a user can establish a direct connection within a third party system with another user who is considered a friend. Users of the social networking system can also have an affiliation with a location, interest groups, topics, or other non-user entities. As one example, a user in a third party system can establish an association with a university or any other topic that interests the user and be connected with other users establishing the same association. Other variations should be appreciated, as should the general functionality of this and other examples of a third party system.

A user of a third party system can publish content that can be viewable to other users linked to the user. In some third party systems, for example, the content can be available to "friends," "followers" and/or users in the publisher's "network." As some examples, the user can publish text, images, video, and other media. In other words, a user can publish a "feed," which can be available to other users in the third party system. Users can also be associated with a timeline and/or a news feed, which can, among other things, include information regarding other users with which they are associated in the third party system. As some examples a timeline of a user can include information such as birthdays, anniversaries, and/or other events associated with other users with which the user has a connection. Accordingly, the third party system can also maintain a user data store, which can house information about the various users the third party system. In the depicted example, the user data store can store profile data as well as user associations or linkages within the third party system.

The client 106 is representative of a plurality of devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser and/or other applications. The browser may be executed in a client 106, for example, to access and render network pages, such as web pages, or other content served up by the computing device 103 and/or other servers in which a media player user interface 139 generated by the media player application 119 can be rendered. The client 106 may be configured to execute applications beyond a browser such as, for example, email applications, instant message applications, and/or other applications. Accordingly, in some embodiments a user can manipulate a user interface presented in the form of network pages shown on a display device via the browser or other application that causes interaction with the computing device 103.

Another example of a client 106 that can interact with the computing device 103 includes a client 106 that can execute a special purpose application such as a mobile application that can render the media player user interface 139. Such an application can allow the user to download, upload and/or stream media to or from the media player application 119 as well as transmit and/or receive information that can be displayed in the user interface rendered on the client 106. In some embodiments, such a client may also include a desktop computer, tablet computing system, smartphone, or any other device in which a special purpose application can be executed.

In either scenario, a user's interactions with the media player user interface 139 can cause media consumption events 171 that relate to media the user consumes and/or in which the user has an interest that are generated by the media player user interface 139 and transmitted to the media player application 119, which can associate the media consumption events 171 with a user's consumption history 165. Additionally, event recommendations 173 can be generated by the event recommendation service 121 based upon the consumption history 165 of the user, and these event recommendations 173 can be placed within the media player user interface 139 as described herein.

Next, a general description of the operation of the various components of the networked environment 100 is provided. To begin, the media player application 119 can allow users to consume media stored in the data store 120 and/or on a client 106 in a media player user interface 139 generated by the media player application 119 and rendered in a browser. The media player application 119 can also provide data that can be displayed in a media player user interface generated by a client media player application executed on a client 106. The media player application 119 can receive media consumption events 171 generated by the user's activity within the media player user interface 139 and store the user's activity in the user's consumption history 165.

A media consumption event 171 can correspond to a user playing a media 133 item in the media player user interface 139. Accordingly, the media consumption event 171 can identify the media 133 item played by the user. A media consumption event 171 can also correspond to the user's interactions with content extracted from a third party social networking system and rendered in the media player user interface 139. Accordingly, if a user follows a hyperlink provided in an artist feed in a social networking system, where the user can be a follower of the artist, the media player user interface 139 can generate a media consumption event 171 corresponding to that interaction. In this scenario, the media consumption event 171 can identify the artist with which the user is interacting.

As an additional an example, a media consumption event 171 can be generated that corresponds to the user commenting on or "liking" content in the user's feed where the content corresponds to an artist and/or song that may be present in the user's media collection or in the media collection of another user to which the user is linked in a social networking system. In this scenario, the user may follow a hyperlink presented in the media player user interface 139 that corresponds to such an action, and the media player user interface 139 is configured to generate and transmit to the computing device 103 a media consumption event 171 identifying the hyperlink the user followed and/or an artist and/or media item that is associated with the hyperlink.

In one embodiment, the media player application 119 can receive the media consumption event 171 corresponding to a hyperlink followed by a user in the media player user interface 139. Accordingly, the media player application 119 can extract text from the hyperlink and/or a destination site associated with the hyperlink and attempt to match the text with meta data 146 associated with a media 133 item in the user's media collection or with media entries that are potentially not present in the user's media collection. Upon matching of the text with an artist and/or media 133 item, the media player application 119 can create a corresponding entry in the consumption history 165 of the user.

The event recommendation service 121 can generate event recommendations 173 for users that can be rendered in a module in the media player user interface 139 or otherwise transmitted to a user. The event recommendation service 121 can generate event recommendations 173 by identifying a pattern of media consumption of a user, generating artist recommendations based on the consumption history 165 of the user, and then generating an event recommendation 173 when an event corresponding to the artist is occurring within or near a location associated with the user. The artist recommendation can be based upon whether media 133 items corresponding to an artist appear in the consumption history 165 of a user. In other words, if a user listens to a particular artist, then the event recommendation service 121 can generate a corresponding artist recommendation.

As an additional example, an artist recommendation can be generated for the user by identifying media 133 items that are similar to entries in the user's consumption history 165. For example, the event recommendation service 121 can generate an artist recommendation for a user by identifying media 133 items that include meta data 146 that also includes the same genre, artist, or other attributes. As another example, in the case of an artist in the consumption history 165 of the user comprising more than one person, the event recommendation service 121 can generate an artist recommendation by identifying other media 133 items that may include one or more of these persons but under a different artist designation.

The event recommendation service 121 can also generate an artist recommendation by identifying an intensity of interest in a particular artist based upon a frequency with which media consumption events 171 appear in the consumption history 165 of a user relative to other artists. For example, a user may have a very intense interest in a particular artist if the artist appears in a higher percentage of the consumption history 165 relative to other artists. Additionally, content from an artist that is published in a third party system and followed by the user, such as in a social networking system, can be retrieved and rendered in a social networking module in the media player user interface 139. Accordingly, if the user interacts with content originating from an artist, a corresponding media consumption event 171 can be generated and stored in the consumption history 165 associated with the user.

The event recommendation service 121 can generate an artist recommendation based upon the consumption history 165 of other users to which a user is linked in a social networking system or any other third party system. For example, the event recommendation service 121 can identify media 133 items in the media collection of other users to which the user is linked and generate an artist recommendation based upon the consumption history 165 of "friends" of the user. As an additional example, the event recommendation service 121 can determine from a timeline or posts in a third party system of the other user whether the other user intends to attend a particular event associated with an artist. The event recommendation service 121 can then generate an artist recommendation for a user if another user to which he or she is linked is attending the event. Such an indication can be detected by determining whether the other user has purchased tickets to the event via an electronic commerce system to which the event recommendation service 121 has access to a purchase history of the other user. As another example, the event recommendation service 121 can generate such an artist recommendation from a textual analysis of content posted by the other user in a third party system to determine whether the user expresses an indication that he or she is attending an event associated with an artist, such as in a status update or post in a social networking system, microblogging system, or other system in which a user can publish content that is made available to the user.

Upon generating an artist recommendation for a user, the event recommendation service 121 can then determine whether an event associated with the artist is taking place within an adjustable time window and within a certain location that is associated with the user. The event recommendation service 121 can access a third party system, such as a third party ticketing system, via the third party system connector 125, in order to determine whether an event corresponding to the artist is taking place within the location. The event recommendation service 121 can also maintain in the data store 120 a list of events that are indexed by artist and/or location to determine whether an event associated with the artist is taking place in or near the location associated with the user.

The location associated with the user can be determined by identifying a shipping address, home address and/or any other address in a user profile 157 of the user. Additionally, the location can be received from the client 106 via a location finding system in the client 106 (e.g., GPS, GLONASS, etc.) that detects a location of a device. Accordingly, the event recommendation service 121 can provide event recommendations that are associated with an artist and that occur within or near the location. For example, the event recommendation service 121 can generate an event recommendation 173 that corresponds to an event featuring the artist that occurs within a predetermined or configurable distance radio of one or more location in the user profile 157 and/or the real-time location of the user.

As noted above, the event recommendation service 121 can identify an intensity of interest in an artist of a particular user. Accordingly, the event recommendation service 121 can also include a ticket pricing tier component with an event recommendation 173. In this example, the ticket pricing tier component of the event recommendation 173 can include a recommended seat and/or pricing tier to the event. In one scenario, the higher an intensity of interest in a particular artist of a user, the higher the recommended pricing tier that can be recommended. Conversely, the lower an intensity of interest in a particular artist, the lower the recommended pricing tier that can be recommended.

Additionally, the event recommendation service 121 can also employ a level of intensity of interest to select a distance from the user's location corresponding to an event recommendation. For example, the event recommendation service 121 can select an event to recommend to a user with a high intensity of interest in an artist that is a greater distance from the user's location than a user with a low intensity of interest in the artist. Conversely, the event recommendation service 121 may provide an event recommendation to a user with a low intensity of interest in an artist if the event is located closer to the user's location relative to other artist events for which the user has a high intensity of interest in the artist.

The demand prediction service 123 can predict a number of users of, for example, a media streaming service facilitated by the computing device 103, that are likely to purchase tickets to a given event occurring in a particular location. The demand prediction service 123 can generate such a prediction by determining an aggregate number of users to which an event recommendation 173 is provided. Then, the demand prediction service 123 can multiply a conversion rate by the number of users to which the event recommendation 173 is generated to determine a number of users likely to purchase tickets to the event. The conversion rate can represent a percentage of people to whom an event recommendation 173 or other advertisement and/or information about the event is provided that will purchase a ticket to the event.

Upon generating a demand prediction associated with an event, in some embodiments, the demand prediction service 123 can reserve or initiate purchase of a block of tickets to the event that can be offered for resale to users to whom an event recommendation 173 is provided. The demand prediction service 123 can interact with a third party system via the third party system connector 125 to initiate purchase of tickets to an event via an event ticketing system. As noted above, because a recommended pricing tier of a ticket can be identified, the demand prediction service 123 can also initiate purchase of tickets to an event of varying ticket pricing tiers to match the aggregate total of recommended pricing tiers provided in respective event recommendations 173 to users.

Additionally, the demand prediction service 123 can also gauge demand for a potential event in a given location based upon a number of users to whom an event recommendation 173 would be generated if a hypothetical event were booked in the location. Accordingly, the demand prediction service 123 can provide such a recommendation to an artist that provides an estimate of potential ticket sales should an event be booked in a given location. Such a recommendation is therefore based upon the music consumption habits of a plurality of users rather than merely a music purchasing history of the users.

Figure 2:
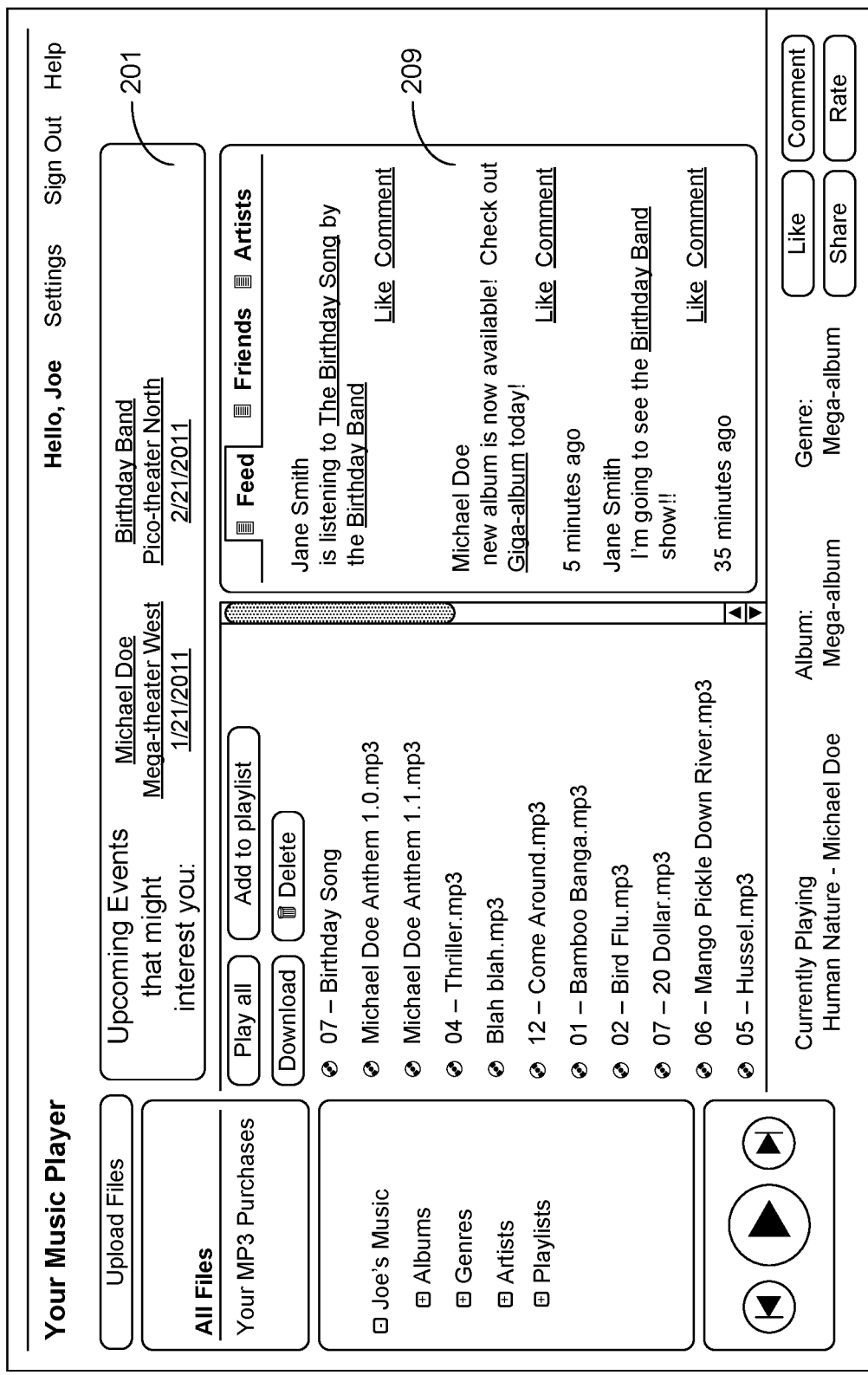

FIG. 2 illustrates one example of a media player user interface 139 that can be generated by the media player application 119. In some embodiments, as is noted above, a media player user interface 139 can be rendered in a browser on a client 106 as well as in a special purpose application. The depicted media player user interface 139 depicts but one example, and it should be appreciated that various layouts and content modules can be provided in the media player user interface 139 without departing from the spirit of the present disclosure. FIG. 2 illustrates one example of an event recommendation module 201 as well as a social network module 209 that can be included in a media player user interface 139.

In the depicted event recommendation module 201, the event recommendation service 121 can provide one or more event recommendations 173 that can be rendered in the event recommendation module 201. As noted above, the event recommendations 173 are based upon the consumption history 165 of the user, which comprises one or more media consumption events 171 that correspond to media played by the user and/or other content with which the user interacts in the media player user interface 139. For example, media consumption events 171 can be generated when the user interacts with content in the social networking module 209, from which an artist recommendation and subsequent event recommendation 173 is generated.

Media consumption events 171 can also be generated that are based upon the user's interactions with a media item itself. For example, if a user interacts with user interface elements that allow the user to add and/or purchase media items, expresses that he or she likes a particular media item, comments on the media item, shares the media item with other users, etc., then a media consumption event 171 corresponding to these interactions is generated by the media player user interface 139.

Figure 3:
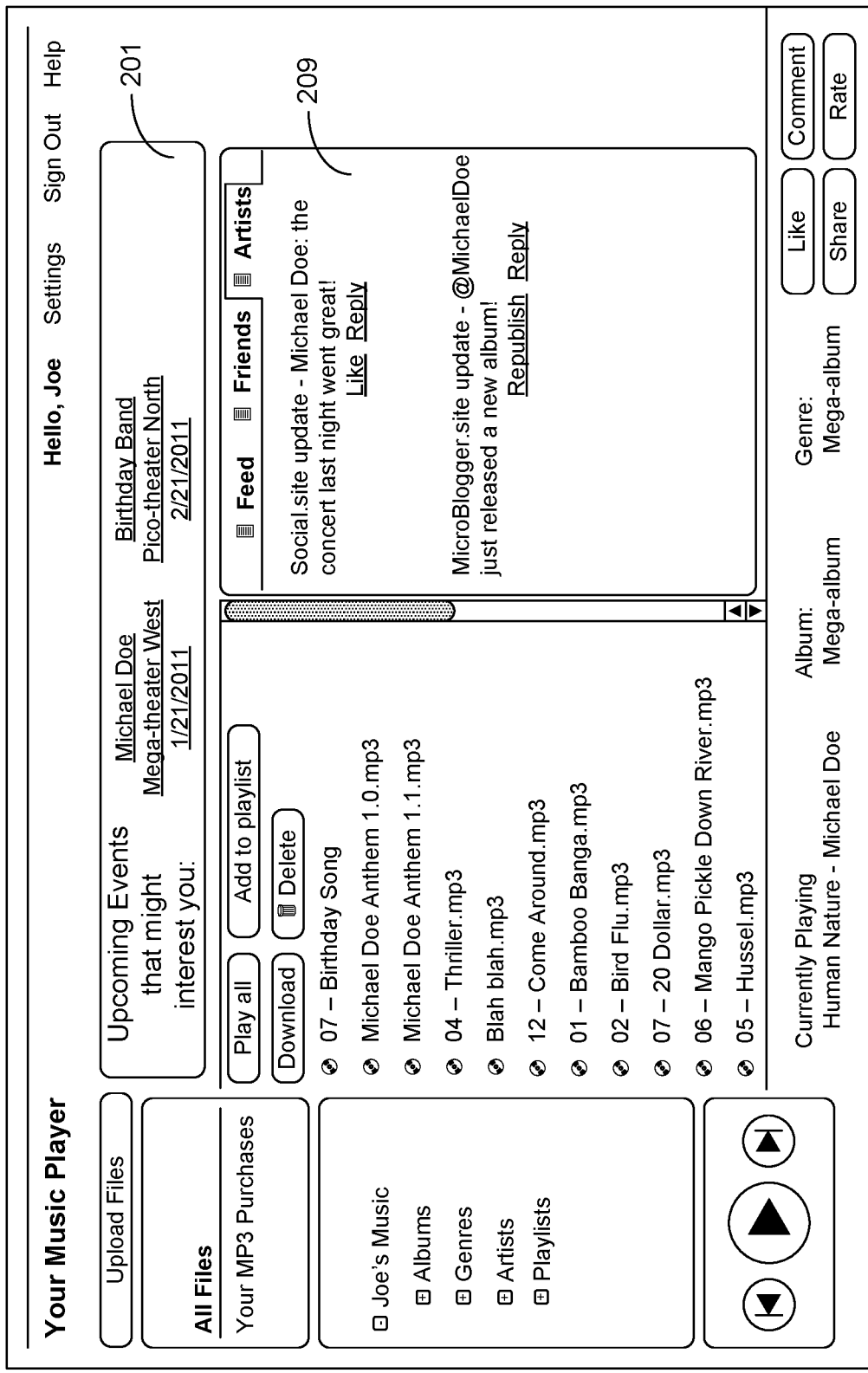

Reference is now made to FIG. 3, which continues the example of FIG. 2. In the media player user interface 139 shown in FIG. 3, the social networking module 209 is shown to display content originating from an artist (e.g., an artist's official feed, content from a band member, etc.). Accordingly, a user's interactions with such content can generate media consumption events 171 that correspond to the artist, thereby potentially causing an event recommendation 173 to be generated by the event recommendation service 121 and rendered in the event recommendation module 201 in the media player user interface 139.

Figure 4:
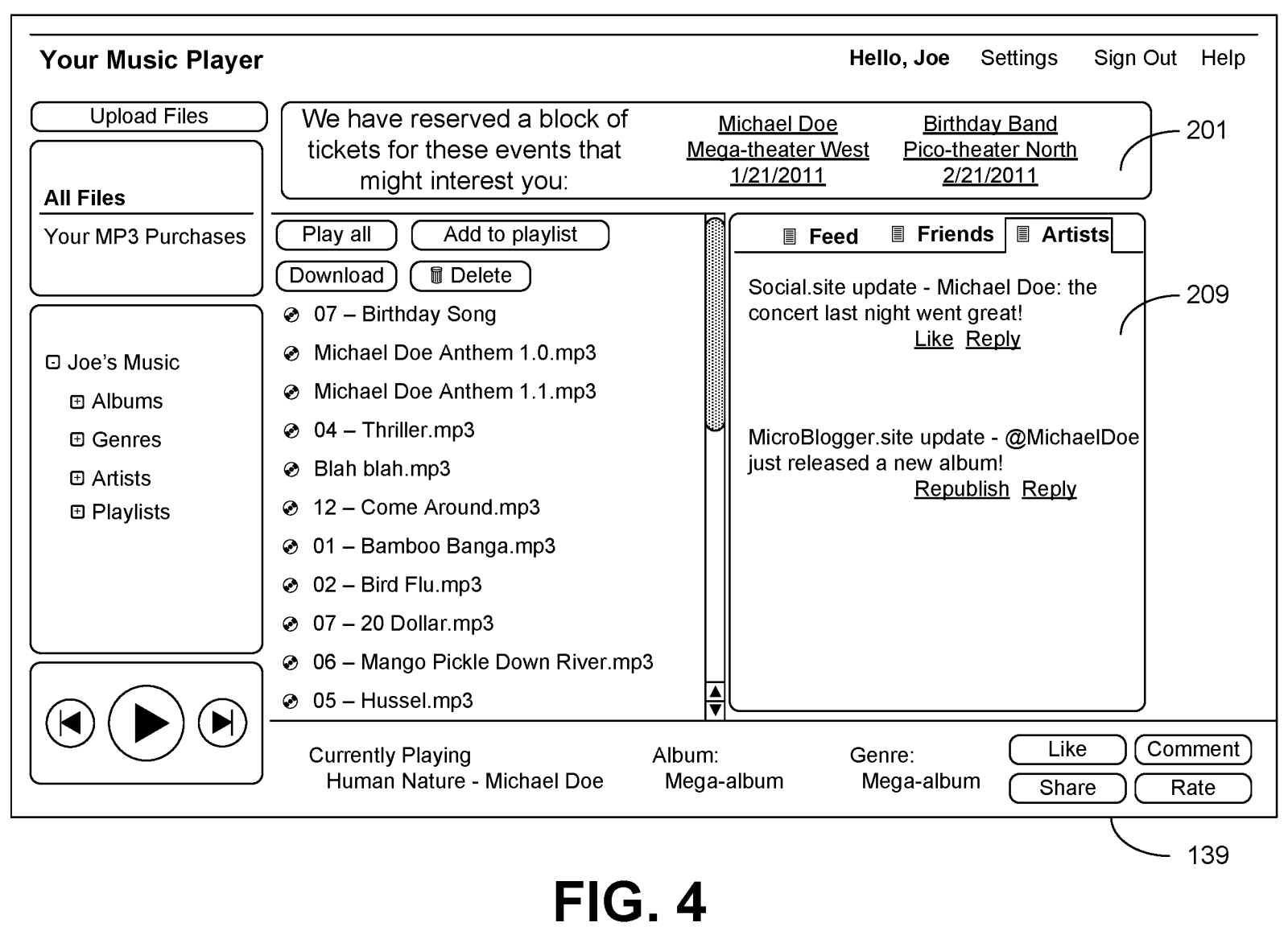

Reference is now made to FIG. 4, which illustrates an example of an event recommendation 173 generated by the event recommendation service 121 as well as an offer to resell tickets for which the purchase was initiated based upon a predicted demand calculated by the demand prediction service 123. In the depicted example, a block of tickets at varying pricing tiers were purchased and offered to users based upon a number of users likely to purchase tickets to the event, which is determined from a conversion rate as well as an aggregate number of users in a particular location to whom the event recommendation 173 is provided.

FIG. 5 depicts an alternative example of content that can be generated and placed within the event recommendation module 201. In the depicted example, the event recommendation service 121 can populate the event recommendation module 201 with event recommendations 173 that are related to other users to which the user is linked in a social networking system. Accordingly, the event recommendations 173 shown can be based on the consumption history 165 of the user, the consumption history 165 of another user, an indication about whether another user is attending a particular event, or any combination of the above.

Figure 6:
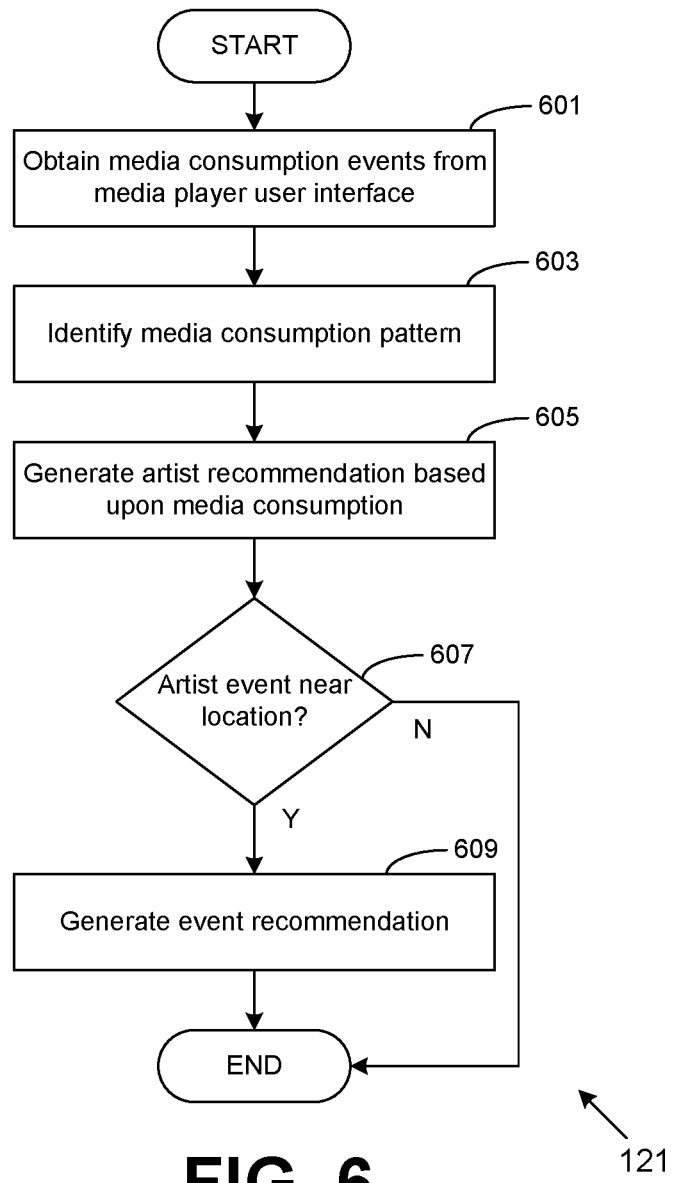
FIGS. 6-7 are flowcharts illustrating one example of functionality implemented as portions of event recommendation service and demand prediction service executed in a computing device in the networked environment of FIG. 1 according to various embodiments of the present disclosure.

Referring next to FIG. 6, shown is a flowchart that provides one example of the operation of a portion of the event recommendation service 121 according to various embodiments. It is understood that the flowchart of FIG. 6 provides merely an example of the many different types of functional arrangements that may be employed to implement the operation of the portion of the event recommendation service 121 as described herein. As an alternative, the flowchart of FIG. 6 may be viewed as depicting an example of steps of a method implemented in the computing device 103 (FIG. 1) according to one or more embodiments.

Beginning with box 601, the event recommendation service 121 can obtain media consumption events 171 corresponding to a user's media consumption history 165. In box 603, the event recommendation service 121 can identify a pattern of media consumption by the user, which can include a frequency with which the user consumes media associated with certain genres, artists, or other meta data. In box 605, the event recommendation service 121 can generate an artist recommendation based upon the media consumption patterns that are identified. In box 607, the event recommendation service can identify whether an event corresponding to the artist is occurring within or near a location associated with the user, such as a shipping address, home address, and/or real-time location of the user. In box 609, the event recommendation service 173 can generate an event recommendation for the user if such an event is located. As noted above, the event recommendation 173 can be provided to a media player user interface 139 along with hyperlinks with which a user can acquire tickets to the event.

Figure 7:
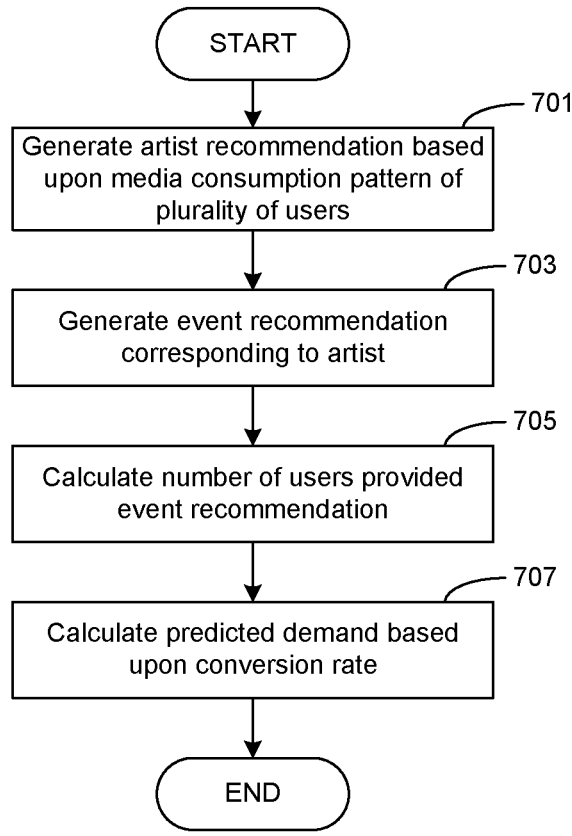

Referring next to FIG. 7, shown is a flowchart that provides one example of the operation of a portion of the demand prediction service 123 according to various embodiments. It is understood that the flowchart of FIG. 7 provides merely an example of the many different types of functional arrangements that may be employed to implement the operation of the portion of the demand prediction service 123 as described herein. As an alternative, the flowchart of FIG. 7 may be viewed as depicting an example of steps of a method implemented in the computing device 103 (FIG. 1) according to one or more embodiments.

Beginning with box 701, the demand prediction service 123 can generate artist recommendations based upon media consumption patterns of a plurality of users. In box 703, the demand prediction service 123 can generate an event recommendation corresponding to the artist. In box 705, the demand prediction service 123 can calculate a number of users to whom the event recommendation is provided. In box 707, the number of users likely to buy tickets to the event can be calculated by employing a conversion rate. The conversion rate can be user configurable or based upon conversion rates that are generally employed in an event ticketing environment.

Figure 8:
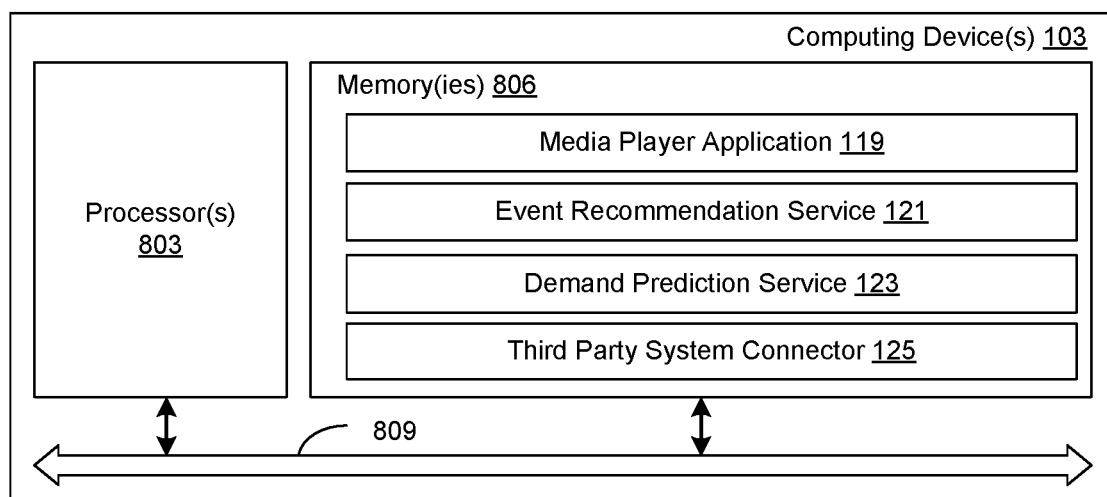
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the media player application 119, event recommendation service 121, demand prediction service 123, third party system connector 125 and potentially other applications. Also stored in the memory 806 may be a data store 120 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as comusic player application disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the media player application 119, event recommendation service 121, demand prediction service 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 5-6 show the functionality and operation of an implementation of portions of the event recommendation service 121 and demand prediction service 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIG. 5-6 show a specific order of execution, it is understood that the order of execution may differ from that which is depicted. For example, the order of execution of two or more blocks may be scrambled relative to the order shown. Also, two or more blocks shown in succession in FIG. 5-6 may be executed concurrently or with partial concurrence. Further, in some embodiments, one or more of the blocks shown in FIG. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media player application 119, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   identify an event associated with a location and at least one artist;
   generate an artist recommendation corresponding to the at least one artist for a plurality of users;
   generate an event recommendation corresponding to the event for a subset of the plurality of users that are located within a distance from the location, wherein the distance is selected based at least in part on a level of intensity of interest for the at least one artist, and the level of intensity of interest is derived from a respective media player associated with individual ones of the plurality of users;
   calculate a number of the subset of the plurality of users associated with the location for whom the event recommendation is generated;
   determine a level of demand associated with the event recommendation based at least upon a conversion rate, the conversion rate being a ratio of the plurality of users likely to purchase tickets for the event out of the number of the plurality of users; and
   reserve a number of tickets for the event with an event ticket system based at least in part on the level of demand.

2. The non-transitory computer-readable medium of claim 1, wherein the program further causes the at least one computing device to at least determine a predicted pricing tier associated with an event ticket for the event, the determination of the predicted pricing tier being based at least upon a plurality of media consumption events associated with a user account.

3. The non-transitory computer-readable medium of claim 1, wherein the number of tickets corresponding to the number of the plurality of users associated with the location for whom the event recommendation is generated multiplied by the conversion rate.

4. A system, comprising:
   at least one computing device; and
   an application executable in the at least one computing device, wherein when executed the application causes the at least one computing device to at least:
   identify an event associated with a location and at least one artist;
   generate an artist recommendation corresponding to the at least one artist for a plurality of users;
   generate an event recommendation corresponding to the event for a subset of the plurality of users that are located within a distance from the location, wherein the distance is selected based at least in part on a level of intensity of interest for the at least one artist, and the level of intensity of interest is derived from a respective media player associated with individual ones of the plurality of users;

calculate a number for the subset of the plurality of users associated with the location for whom the event recommendation is generated;

determine a conversion rate associated with the event recommendation, the conversion rate being a ratio of the plurality of users likely to purchase tickets for the event out of the number of the plurality of users; and reserve a number of tickets for the event based at least upon the conversion rate.

5. The system of claim 4, wherein the respective plurality of media player user interfaces are associated with a networked media storage system.

6. The system of claim 4, wherein the artist recommendation is further based at least upon a textual analysis of content posted by at least one of the plurality of users on a third party networked site.

7. The system of claim 4, wherein reserving the number of tickets for the event comprises initiating a purchase of the number of tickets for the event, the number of tickets corresponding to the number of the plurality of users associated with the location for whom the event recommendation is generated multiplied by the conversion rate.

8. The system of claim 7, wherein the application further causes the at least one computing device to generate an offer to sell at least one ticket from the number of tickets to the plurality of users.

9. The system of claim 8, wherein the application further causes the at least one computing device to populate the offer to sell in the respective plurality of media player user interfaces corresponding to the plurality of users.

10. The system of claim 4, wherein the application further causes the at least one computing device to determine a predicted pricing tier associated with an event ticket, the determination of the predicted pricing tier being based at least upon a plurality of media consumption events associated with a user account.

11. The system of claim 10, the determination of the predicted pricing tier further comprises determining level of intensity of interest associated with the at least one artist based at least upon the plurality of media consumption events associated with the user account, wherein a higher intensity of interest is associated with a higher pricing tier and a lower intensity of interest is associated with a lower pricing tier.

12. A method, comprising:
identifying, by at least one computing device, an event associated with a location and at least one artist;

generating, by the at least one computing device, an artist recommendation corresponding to the at least one artist for a plurality of users;

generating, by the at least one computing device, an event recommendation corresponding to the event for a subset of the plurality of users that are located within a distance from the location, wherein the distance is selected based at least in part on a level of intensity of interest for the at least one artist, and the level of intensity of interest is derived from a respective media player associated with individual ones of the plurality of users;

calculating, by the at least one computing device, a number of the subset of the plurality of users associated with the location for whom the event recommendation is generated;

determining, by the at least one computing device, a conversion rate associated with the event recommendation, the conversion rate being a ratio of the plurality of users likely to purchase tickets for the event out of the number of the plurality of users; and reserving, by the at least one computing device, a number of tickets for the event based at least upon the conversion rate.

13. The method of claim 12, further comprising determining, by the at least one computing device, a predicted pricing tier associated with an event ticket, the determination of the predicted pricing tier being based at least upon a plurality of media consumption events associated with the plurality of users, the predicted pricing tier being included in the event recommendation.

14. The method of claim 13, wherein determining the predicted pricing tier further comprises determining, by the at least one computing device, the level of intensity of interest associated with the at least one artist for a respective user of the plurality of users based at least upon the plurality of media consumption events associated with the respective user, wherein a higher intensity of interest is associated with a higher pricing tier and a lower intensity of interest is associated with a lower pricing tier.

15. The method of claim 14, wherein the level of intensity of interest is determined by calculating a percentage of total media consumption events associated with the respective user that is associated with the at least one artist relative to at least one other artist associated with the plurality of media consumption events.

16. The method of claim 12, wherein reserving the number of tickets for the event comprises initiating, by the at least one computing device, a purchase of the number of tickets for the event, the number of tickets corresponding to a number of the plurality of users associated with the location for whom the event recommendation is generated multiplied by the conversion rate.

17. The method of claim 12, wherein generating the artist recommendation corresponding to the at least one artist for the plurality of users associated with the location is based at least upon a plurality of media consumption events for the plurality of users retrieved from a networked media storage system.

18. The method of claim 12, wherein generating, by the at least one computing device, the artist recommendation corresponding to the at least one artist for the plurality of users associated with the location further comprises retrieving, by the at least one computing device, a location from a respective location detection device associated with individual ones of the plurality of media players of the plurality of users.

19. The method of claim 12, wherein the artist recommendation is further based at least upon a textual analysis of content posted by the plurality of users on a third party networked site.

20. The method of claim 19, wherein the textual analysis of the content determines that at least one of the plurality of users is attending the event.

* * * * *